United States Patent [19]

Pampouchidis

[11] 4,320,220
[45] Mar. 16, 1982

[54] CATHODICALLY DEPOSITABLE COATING COMPOSITIONS AND PROCESS FOR SAME

[75] Inventor: Georgios Pampouchidis, Graz, Austria

[73] Assignee: Vianova Kunstharz, A.G., Vienna, Austria

[21] Appl. No.: 816,937

[22] Filed: Jul. 20, 1977

[30] Foreign Application Priority Data

Jul. 19, 1976 [AT] Austria ............................... 5283/76
Oct. 29, 1976 [AT] Austria ............................... 8066/76
Oct. 29, 1976 [AT] Austria ............................... 8067/76
Dec. 20, 1976 [AT] Austria ............................... 9454/76

[51] Int. Cl.³ ............... C08G 18/71; C08G 18/62; C08G 18/76; C08G 18/67
[52] U.S. Cl. ............................... 524/591; 204/181 C; 528/69; 528/75; 528/67; 524/901; 524/548; 524/555; 524/507; 528/49
[58] Field of Search .................. 528/69, 75, 49, 67; 204/181 C; 260/29.2 TN

[56] References Cited

U.S. PATENT DOCUMENTS

| | | | |
|---|---|---|---|
| 3,883,483 | 5/1975 | Anderson et al. | 528/45 |
| 3,939,051 | 2/1976 | Anderson et al. | 204/181 C |
| 4,031,050 | 6/1977 | Jerabek | 204/181 C |
| 4,036,800 | 7/1977 | Sekmakas | 204/181 C |
| 4,129,490 | 12/1978 | Schimmel | 204/181 C |
| 4,147,676 | 4/1979 | Pampouchidis | 528/75 |

FOREIGN PATENT DOCUMENTS

| | | |
|---|---|---|
| 2131060 | 3/1973 | Fed. Rep. of Germany . |
| 2360098 | 6/1974 | Fed. Rep. of Germany . |
| 2541234 | 4/1976 | Fed. Rep. of Germany . |
| 2603666 | 8/1976 | Fed. Rep. of Germany . |
| 1413054 | 11/1975 | United Kingdom . |

*Primary Examiner*—H. S. Cockeram
*Attorney, Agent, or Firm*—A. W. Breiner

[57] ABSTRACT

Self-crosslinking coating compositions which are cathodically deposited on electrodeposition of paints containing the coating compositions and a process for producing aqueous solutions of the self-crosslinking coating compositions by acid neutralization are described. The coating compositions are the reaction products of a resin carrying amine groups and hydroxyl or carboxyl groups, and the reaction product carrying one free isocyanate group of a polyisocyanate and at least one ethylenically unsaturated monomer having at least one isocyanate reactive hydrogen atom and the group

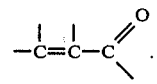

The cathodically depositable electrodeposition paints cure rapidly at relatively low temperatures to provide films which are highly resistant to corrosive influences.

42 Claims, No Drawings

CATHODICALLY DEPOSITABLE COATING COMPOSITIONS AND PROCESS FOR SAME

The present invention is directed to the preparation of coating compositions which are water dilutable upon neutralization with acids and which are electrically depositable at the cathode of an electrodeposition cell. The compositions crosslink through thermal polymerization without additional components.

Electrophoretic deposition of synthetic resins and plastics, also called electrodeposition, although known for quite some time, only gained technical importance as a coating process in recent years. The coating compositions or binders presently known for electrical deposition contain polycarboxylic acid resins neutralized with bases. The products deposit at the anode. Owing to the acidic character of the binders they are sensitive to the corroding influences exerted by salts and particularly by alkaline materials. Furthermore, coatings of the aforesaid compositions tend to discolor, water spot, or undergo other chemical changes as a result of the metal ions which are anodically dissolved from the anode.

Numerous binders are disclosed in the prior art which include groups neutralizable with acids, which can be deposited on cathodically wired objects through the action of an electric current. The most serious problem with such coating compositions is the non-availability of normally used crosslinking aids which, with anodic deposition, are represented by a more or less acidic film or the oxygen originating at the anode. The known coating compositions which are cathodically depositable through introduction of amine groups, therefore, require the addition of acid catalysts to enable the reaction with crosslinking agents, i.e., amine or phenolic resins. Note the disclosure of CH-PS No. 575,987 corresponding to DT-OS No. 23 60 098 and GB-PS No. 1,413,054. It is evident that these substances adversely influence bath stability, application characteristics and film properties.

DT-OS No. 21 31 060 discloses coating compositions which consist of polyamine resins and masked isocyanates. They are two component systems giving rise to problems of bath stability in many cases. Furthermore, due to the presence of the masked isocyanates, high temperatures and long periods of time are required for curing. Additionally, the masking agents for the isocyanates have to evaporate on stoving and this leads to soiling of the stoving equipment and to pollution of the air. Residues of the masking substances in the film have, of course, an adverse influence on the film properties. Similar systems are described in FR-PS No. 22 85 434, corresponding to DT-OS No. 25 41 234, and in DT-OS No. 26 03 666.

Further, DT-OS No. 22 52 536 discloses the preparation of cathodically depositable coating compositions from combinations of epoxy-resin-amine adducts and isocyanate containing products of diisocyanates and alcohols. These compositions also require high temperatures and long periods of time for curing for satisfactory film formation. Further disadvantages are pollution through the urethane decomposition products and the adverse influence of inert residual components in the film on the performance of the coating.

Finally, U.S. Pat. Nos. 3,883,483 and 3,939,051 disclose reaction products in connection with cathodic binders. The disclosed products are obtained from alcohols, diisocyanates and hydroxyalkylacrylates which serve as copolymerizable monomers in the production of copolymers. Film formation is effected through urethane splitting, entraining disadvantages noted hereinbefore.

It has now been found that coating compositions for cathodically depositable electrodeposition paints which are thermosetting, i.e., which do not require crosslinking components, and which do not have the disadvantages of the products heretofore known in the art, can be produced if a base resin carrying amine groups and isocyanate reactive hydrogen groups, is reacted with an unsaturated isocyanate intermediate product and the resulting unsaturated basic urethane resin is rendered water soluble through partial neutralization with acid.

The present invention describes, therefore, a process for producing self-crosslinking coating compositions for cathodically depositable electrodeposition paints which is characterized in that a resin carrying amine groups and hydroxyl and/or carboxyl groups is reacted with a reaction product carrying one free isocyanate group which is obtained through reaction of aromatic, aliphatic, or cycloaliphatic polyisocyanates or mixtures thereof, and α,β-ethylenically unsaturated monomers carrying at least one isocyanate reactive hydrogen atom and the group

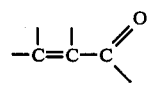

The resulting reaction product is rendered water soluble through partial or total neutralization with inorganic and/or organic acids. The quantities of unsaturated monoisocyanate intermediate is chosen in order that for each 1000 molecular weight units at least 0.5 double bonds, preferably 0.8–2.5 double bonds, are present.

The binders of the invention are self-crosslinking and cure through heat polymerization of the α,β-unsaturated double bonds. The resulting films exhibit superior resistance to chemicals, water, alkali and corrosion.

Further, the coating compositions of the invention show a number of advantages. Through judicious selection of the amine group containing base resin, on the one hand, the properties of the coatings can be influenced, while, on the other hand, the basicity of the system can be adjusted in order that after partial neutralization, at a pH-value of 6–8, dilution with water and electrodeposition can be carried out. Accordingly, problems of bath stability are prevented. Further corrosion of the application or stoving equipment as a result of released acids is avoided.

Another primary advantage of the coating compositions of the invention is that the compositions do not require hardening components or acid catalysts for curing, precluding any problems with such components. Moreover, through selection of type and the amount of the polymerizable isocyanate containing intermediate the properties, and particularly the crosslinking density, of the coatings can be varied within wide limits. Thus, the desired flexibility of the resultant film can be tailored to the exigencies of final use. In addition, aqueous solutions of the present class of coating compositions afford excellent conductivity. The deposited films, however, have good insulating characteristics. Thus, deposition can be carried out at high voltage, which, in turn, is a preliminary condition for good throwing power of the coating composition. Still another advantage of the present invention is the fact that the coating compositions of the invention carry the double bonds exclusively at the end of a chain (chain end) or in a side chain. Curing through thermic polymerization can, therefore, be effected at relatively low temperatures during short stoving times. Finally, curing of the coating compositions of the invention is effected through thermic polymerization of the —C=C— double bonds. Through this —C—C— crosslinking the resulting coatings afford excellent resistance to water, chemicals, and other corroding influences which is of paramount importance.

Synthesis of the base resins is accomplished with a variety of raw materials to introduce basic amine groups into macromolecules. The following will provide details and modifications of various methods of preparation.

(A.) Macromolecules with basic nitrogen atoms are obtained through addition reaction of epoxy groups with secondary amines.

The raw materials carrying epoxy groups most widely known with the common characteristics of structures according to the formula

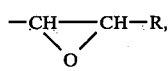

wherein R is hydrogen or alkyl, are the the glycidyl ethers of phenols, particularly of 4,4'-bis(hydroxyphenyl)-propane (Bis-phenol A). Glycidyl ethers of phenol-formaldehyde condensates of the novolak type are also useful as well as glycidyl esters of aliphatic, aromatic or cycloaliphatic mono- or polycarboxylic acids, glycidyl ethers of aliphatic or cycloaliphatic diols or polyols, copolymers of glycidyl(meth)acrylate or expoxidized products of aliphatic or cycloaliphatic olefins. A. M. Paquin, in *Epoxidverbindungen und Epoxyharze*, Springer 1958, gives a detailed survey of this class of materials which can be used in accordance with the present invention.

Suitable secondary amines for addition to the epoxy group include dimethylamine, diethylamine, their higher homologues or isomers, and cyclic secondary amines such as ethylene imine, morpholine, and piperidine.

The two reaction partners and the weight ratios are chosen in order that with equivalent addition the macromolecule will carry a sufficient quantity of basic nitrogen atoms to provide a water dilutable final product on partial neutralization. An excess of secondary amines is, in general, not desired since it does not contribute to the formation of the desired macromolecule.

A preferred modification to this class of macromoles is characterized in that amine group and hydroxy group containing resins are obtained through reaction of 2 moles of diepoxy compound, 1 mole of aliphatic dicarboxylic acid and 2 moles of secondary amine, preferably a secondary dialkanol amine. The properties of the binders are improved particularly with regard to surface qualities and mechanical properties and thus corrosion resistance.

Control of the viscosity during the crosslinking reaction on stoving is essential since on electrodeposition a relatively large quantity of hydrogen forms at the cathode which is not easily released from highly viscous wet films. The entrapped hydrogen gas leads to porous films and rough films unless the coating composition has good flow and levelling on stoving.

The base resins used according to the above modifications are produced as follows. In a first step 2 moles of a diepoxy compound are reacted with 1 mole of aliphatic dicarboxylic acid from about 100° to 150° C. until an acid value of 0 mg KOH/g is obtained. The resulting modified diepoxy compound is totally reacted with 2 moles of a secondary amine at 80°–160° C. The reaction products are also very uniform and satisfactory, if the reaction is carried out simultaneously with all three components at from about 100° to 160° C. The preferred diepoxy compounds are diglycidylethers of phenols in particular reaction products of 4,4'-bis(hydroxyphenyl)-propane (Bisphenol A) or their hydrated or alkyl or halogen substituted derivatives with iepchlorohydrin. Suitable aliphatic dicarboxylic acids are those carrying at least 3 C-atoms in the main chain such as malonic acid, succinic acid, glutaric acid, adipic acid, pimelic acid, azelaic acid, sebasic acid, tetradecan dicarboxylic acid and the branched isomers of these acids. Among the preferred dialkanolamines are diethanolamine, dipropanolamine, dibutanolamine, their isomers and higher homologues. Suitable dialkylamines include dimethylamine, diethylamine, their higher homologues and isomers, and cyclic secondary amines such as ethylene imine, morpholine, and piperidine.

(B.) Macromolecules with basic nitrogen atoms are obtained through copolymerization of suitable basic monomers with hydroxyalkyl(meth)acrylates, preferably in the presence of other copolymerizable compounds. Suitable basic monomers include the (meth)acrylates, with N,N-dimethyl-aminoethyl(meth)acrylate being preferred. Other suitable monomers with basic nitrogen atoms include vinylpyridine, N-vinylimidazol, and N-vinylcarbazol. The basic monomers can be used as or in copolymers with hydroxyalkyl(meth)acrylates and, preferably, with other (meth)acrylates, (meth)acrylamides, aromatic vinyl compounds such as styrol, vinyltoluol, α-methylstyrol, etc.

(C.) Macromolecules with basic nitrogen atoms suitable for use herein include the substituted oxazolines, which are obtained, e.g., through cyclizing condensation of amine alcohols, such as trishydroxymethyl aminomethane or 2-amino-2-hydroxymethyl-1,3-propanediol, with aliphatic carboxylic acids or carboxy macromolecules. A summarizing survey of such oxazolines is given by J. A. Frump, *Chemical Reviews*, 1971, Vol. 71, No. 5, pp. 483–505.

(D.) Macromolecules with basic nitrogen atoms for use herein are also obtained through addition reaction of anhydride group containing substances with monoalkanolamines, particularly with dialkylalkanol amines, such as dimethyl or diethylethanol amine. The addition reaction, with semiester formation, is carried out at 50° to 150° C., preferably at from 90° to 120° C. The reaction is exothermic. Suitable starting materials are succinic anhydride derivatives or Diels-Alder adducts as are obtained, for example, through addition of maleic anhydride to compounds with isolated or conjugated double bonds. This group includes adducts of maleic anhydride to unsaturated oils, fatty acids and resin acids, to diene polymers, to unsaturated hydrocarbon resins, etc. Furthermore, copolymers carrying anhydride structures, for example styrene maleic anhydride copolymers, can be used as well.

Suitable unsaturated monoisocyanate intermediates are reaction products of aromatic, aliphatic or cycloaliphatic diisocyanates or polyisocyanates, mixtures thereof, or blends thereof with ethylenically unsaturated monomers, carrying at least one isocyanate reactive hydrogen atom and the structure

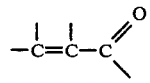

The reaction is carried out at from 20° to 80° C., preferably 30° to 60° C. The weight ratios of the reaction partners are chosen in order that the isocyanate intermediate contains an average of one free isocyanate group.

Suitable di- or polyisocyanates are the aromatic polyisocyanates including 2,4- or 2,6-toluene diisocyanate, 4,4'-diphenylmethane diisocyanate; diphenylmethylmethane-4,4'-diisocyanate; naphthylene-1,5-diisocyanate; triphenylmethane-4,4',4''-triisocyanate; or cycloaliphatic isocyanates including isophorone diisocyanate; cyclohexane-1,4-diisocyanate, and aliphatic isocyanates including trimethyl-hexamethylene-1,6-diisocyanate and tris-hexamethylene-triisocyanate. Polyisocyanates include at least two, or a plurality of isocyanate groups.

Preferred $\alpha,\beta$-unsaturated monomers for reaction with the polyisocyanates are the hydroxyalkyl esters of acrylic or methacrylic acid, the alkyl radical carrying from 2 to 10 C-atoms, such as hydroxyethylacrylate; hydroxyethylmethacrylate; 2-hydroxypropylacrylate; 2-hydroxypropylmethacrylate; 4-hydroxybutylacrylate; 4-hydroxybutylmethacrylate; tripropyleneglycolmonoacrylate; and tripropyleneglycolmonomethacrylate. Further, carboxy group containing $\alpha,\beta$-unsaturated compounds can be reacted with polyisocyanates including acrylic or methacrylic acid, maleic acid, semiesters of maleic anhydride and monoalcohols with from 1 to 6 C-atoms. Another group of monomers suitable for use comprises amine groups containing $\alpha,\beta$-unsaturated compounds, as long as they carry an active hydrogen atom. Among these are (meth)acrylamide and the corresponding derivatives.

The process of the invention is carried out in order that the mentioned amine group containing starting resins, optionally dissolved in isocyanate inert solvents, are reacted at 20° to 80° C., preferably at from 40° to 60° C. with the desired quantity of isocyanate intermediate. At 50° C., the reaction is finished after about one hour, at lower temperatures it takes comparatively longer.

In a preferred modification of the process, the amine and hydroxy and/or carboxy group containing resin, in addition to the polymerizable hydroxyacrylate-isocyanate reaction product is reacted with from 10 to 100 mole-% (on the sum of still free hydroxy and carboxy groups) of a reaction product carrying one free isocyanate group and being obtained from aliphatic, aromatic, cycloaliphatic polyisocyanates or mixtures thereof and an unsaturated and/or saturated monoalcohol with at least 6 C-atoms. The compositions obtained have superior surface qualities, mechanical properties and resistances to corrosion. The improved properties can also be effected by reacting the amine and/or carboxy group containing resin in addition to the polymerizable hydroxyacrylate isocyanate reaction product with from 10 to 100 mole-% of a reaction product carrying one free isocyanate group and being obtained from an aliphatic, aromatic, cycloaliphatic polyisocyanate or mixtures thereof and an unsaturated and/or saturated monocarboxylic acid with at least 6 C-atoms. The reaction with the aforesaid additional components can be carried out simultaneously or after reaction with the hydroxyacrylate isocyanate reaction product as previously described. In a further modification, the base resin can be modified with the concurrent reaction product of 1 mole of diisocyanate, 0.4 to 0.9 moles of a hydroxyacrylate and/or hydroxymethacrylate and 0.1 to 0.6 moles of a suitable monoalcohol or a suitable monocarboxylic acid with at least 6 C-atoms. The quantities of the reaction partners are chosen in order that 1 mole of diisocyanate and 1 mole of the blend of hydroxy(meth)acrylate and monoalcohol or monocarboxylic acid are reacted.

Long chain unsaturated monoalcohols suitable for reaction are, e.g., 10-undecene-1-ol; 9 c-octadecene-1-ol (oleyl alcohol); 9 t-octadecene-1-ol (elaidyl alcohol); 9 c, 12 c-octadecadiene-1-ol(linoleyl alcohol); 9 c, 12 c, 15 c-octadecatriene-1-ol (linolenyl alcohol); 9 c-eicosene-1-ol (gadoleyl alcohol); 13 c-docosene-1-ol (eruca alcohol); and 13 t-docosene-1-ol (brassidyl alcohol). Saturated monoalcohols with at least 6 C-atoms can be co-employed in suitable level to enhance flow characteristics. Such monoalcohols include hexanol, nonanol, decanol and their homologues, such as dodecanol (laurylalcohol), octadecanol (stearyl-alcohol), etc., as well as alkyl alcohols such as 2-ethylhexanol, 2-pentylnoanol, 2-decyltetradecanol, and other alcohols known as Guerbet-alcohols.

The reaction of these monoalcohols with the polyisocyanate or blends thereof for preparing the additional intermediate product is carried out at 20° to 80° C. and preferably 30° to 60° C. The additional plasticizing fatty acid component is prepared by reaction of aromatic, aliphatic or cycloaliphatic di- or polyisocyanates or blends thereof with long chain saturated or unsaturated monocarboxylic acids with at least 6 C-atoms, for example, n-capronic acid, isononanic acid, palmitic acid, oleic acid, linoleic acid, linolenic acid, and stearic acid, at from 20° to 90° C., preferably 40° to 70° C., releasing $CO_2$. Other suitable unsaturated or saturated monocarboxylic acids are semiesters of alphatic, cycloaliphatic or aromatic dicarboxylic acid anhydrides with saturated or unsaturated monoalcohols.

The amine groups of the binders of the invention are partially or totally neutralized with organic and/or inorganic acids, e.g., formic acid, acetic acid, lactic acid, phosphoric acid, etc., and are then diluted with water. The degree of neutralization depends upon the characteristics of the individual binder. The preferred binder composition allows dilution or dispersion with water at a pH-value of from 4 to 9 and preferably 6 to 8. The concentration in water of the binder depends upon the parameters of electrodeposition and may lie in a range of between 3 to 30% by weight, preferably of from 5 to 15% by weight. The applied coating composition may optionally contain various additives, including pigments, extenders, surface active agents, etc.

Upon electrodeposition the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc., but also of other metalized materials or materials rendered conductive through a conductive coating.

After deposition, the coating is cured at a stoving schedule of from 130° to 200° C., preferably 150° to 180° C. for about 5 to 30 minutes, preferably 10 to 25 minutes.

The following examples illustrate the invention without limiting the scope of it:

PREPARATION OF THE MONOISOCYANATE INTERMEDIATES

The isocyanate was charged to a suitable reaction vessel and, excluding access of humidity, the isocyanate-reactive monomer or the monoalcohol or monocarboxylic acid was continuously added at from about 25° to 35° C. within 1 hour. Then the batch was slowly heated to 70° C. and held for another hour.

The composition of the various intermediates is listed in the table headed "Intermediates". The formulations contain an average of 1 equivalent of free isocyanate groups.

| No. | Quantity (g) and type of isocyanate | Quantity (g) and type of reaction partner |
| --- | --- | --- |
| A | 174 tolulenediisocyanate | 130 hydroxyethylmethacrylate |
| B | 174 tolulenediisocyanate | 130 hydroxypropylacrylate |
| C | 174 tolulenediisocyanate | 144 hydroxybutylacrylate |
| D | 174 tolulenediisocyanate | 86 acrylic acid |
| E | 174 tolulenediisocyanate | 172 monobutylmaleate |
| F | 174 tolulenediisocyanate | 85 methacrylamide |
| G | 222 isophoronodiisocyanate | 116 hydroxyethylacrylate |
| H | 168 hexamethylenediisocyanate | 130 hydroxyethylmethacrylate |
| I | 174 tolulenediisocyanate | 144 nonanol |
| K | 174 tolulenediisocyanate | 268 oleylalcohol |
| L | 174 tolulenediisocyanate | 266 linoleyalcohol |
| M | 174 tolulenediisocyanate | 91 hydroxyethylmethacrylate (0.7) 80.5 oleylalcohol (0.3) |
| N | 174 tolulenediisocyanate | 200 lauric acid |
| O | 174 tolulenediisocyanate | 278 linolenic acid |
| P | 174 tolulenediisocyanate | 242 maleic anhydride-hydroxy butylacrylate semi-ester |
| R | 174 tolulenediisocyanate | 91 hydroxyethylmethacrylate (0.7) 84.6 oleic acid (0.3) |

The following is a key to abbreviations used in Tables 1–6 referred to in the following examples,

| | |
| --- | --- |
| EPA : | liquid epoxy resin based on Bisphenol A (4,4'-bis(hydroxyphenyl)propane) with an epoxy equivalent of from 180 to 190. |
| EPH B : | solid epoxy resin based on Bisphenol A with a melting range of from 64 to 75° C. and an epoxy equivalent of from 450 to 500. |
| EPH C : | highly viscous epoxy resin based on Bisphenol A with an epoxy equivalent of about 260. |
| COP I : | solution polymer, prepared in known manner as a 60% solution in AEGLAC from 250 parts of ethylacrylate, 250 parts methylmethacrylate, 116 parts n-butylacrylate, 284 parts of glycidylmethacrylate and 100 parts of styrene. |
| EPB : | commercially avialable epoxidized polybutadiene with an epoxy equivalent of about 300 and a viscosity of about 700 cP/50° C., with an average molecular weight of about 1500. |
| COP II : | solution polymer, prepared in known manner from 250 parts of methylmethacrylate, 250 parts ethylacrylate, 250 parts N,N-dimethylaminoethylacrylate and 250 parts hydroxyethylmethacrylate in a solution of 430 parts of AEGLAC. |
| OPE I : | oxazoline polyester prepared according to Austrian Patent Specification No. 309,624 from 273 parts dimethylterephthalate, 312 parts neopentylglycol, 363 parts adipic acid and 225 parts tri-(hydroxymethyl)-aminomethane. |
| COP III : | copolymer from styrene and maleic anhydride with a molecular weight of about 2000 and a maleic anhydride equivalent of about 500. |
| PBA : | maleic anhydride adduct to a liquid polybutadiene with more than 60% of cis-1,4-configuration, over 25% of trans-1,4-configuration and less than 3% of vinyl double bonds, with a molecular weight of about 1500 and a viscosity of about 750mPa.s (20° C.), the ratio between polybutadiene and maleic anhydride being 8:1 (parts by weight) and the maleic anhydride equivalent resulting therefrom being about 500. |
| DOLA : | diethanolamine |
| DIPA : | diisopropanolamine |
| DMEA : | dimethylethanolamine |
| DPA : | diisopropanolamine |
| DBA : | diisobutylamine |
| AEGLAC : | monoethylether acetate |
| AEAC : | ethylacetate |
| DMF : | dimethylformamide |
| ADI : | adipic acid |
| SUB : | suberic acid |
| FKP : | solids content, % by weight |

EXAMPLES OF THE INVENTION

EXAMPLES 1–12

These examples describe the reaction of epoxyamine intermediates with monoisocyanate intermediates. The epoxy compound is charged to a reaction vessel equipped with stirrer, addition funnel, thermometer, and reflux condensor, optionally in the presence of an isocyanate inert solvent such as monoethyleneglycolmonoethylether acetate.

The secondary amine is added within 1 hour and is totally reacted at elevated temperature for another hour. The reaction product is mixed with the monoisocyanate intermediate and is reacted, preventing access of humidity, at 50° to 60° C. during 1 to 2 hours until an NCO-value of 0 is recorded.

When using liquid epoxy resins, e.g., as in Example 1, the reaction with the amine can be carried out without solvents. The reaction product is diluted with the desired solvent.

Weight ratios and reaction conditions for these examples are listed in Table 1.

EXAMPLES 13-16

Examples 13 to 16 describe reaction products of basic nitrogen containing intermediates with monoisocyanate intermediates.

The products are prepared according to Examples 1-12. Weights and reaction conditions are listed in Table 2.

EXAMPLES 17-20

Examples 17-20 describe reaction products of anhydride group containing compounds with alkanolamines and unsaturated monoisocyanate intermediates.

The solution of the anhydride compound is reacted at 120° to 150° C. with the alkanol amine until an acid value is reached which corresponds to the semiester. The product is then further reacted at about 60° C. with the monoisocyanate intermediate, until an NCO-value of 0 is recorded.

Weight ratios and reaction conditions are listed in Table 3.

EXAMPLES 21-28

These examples show the use of diepoxy-dicarboxylic acid-amine-reaction products as the base resin.

The epoxy compound, charged to a reaction vessel equipped with stirrer, addition funnel, thermometer and reflux condensor, is mixed with a dicarboxylic acid and a secondary amine, optionally in the presence of an isocyanate inert solvent such as monoethyleneglycolmonoethyletheracetate (ethylglycolacetate) and is reacted completely at 100° to 160° C. The reaction product is mixed with a monoisocyanate intermediate and, preventing access of humidity, is reacted at 50° to 60° C. for 1 to 2 hours until an NCO-value of 0 is recorded. The epoxy compound and the dicarboxylic acid can also be reacted together in a separate reaction step, without materially different results.

The quantities of the components and the reaction conditions are listed in Table 4.

EXAMPLES 29-37

These examples show the use of plasticizing monoisocyanate intermediates of isocyanates and monoalcohols.

The epoxy compound is charged to a reaction vessel equipped with stirrer, addition funnel, reflux condensor and thermometer. The secondary amine, optionally in the presence of an isocyanate inert solvent such as ethyleneglycolmonoethyletheracetate (ethylglycolacetate), is added within 1 hour and reacted completely at elevated temperature. The reaction product is mixed with the monoisocyanate intermediate and, preventing access of humidity, is reacted at 60°–70° C. for 1 to 3 hours until an NCO-value of 0 is recorded. The reaction with the isocyanate intermediate can also be carried out in two steps, i.e., the polymerizable type can be reacted first and then the plasticizing type is reacted. The results are not materially different.

Weight ratios and reaction conditions are listed in Table 5.

EXAMPLES 38-43

These examples show the use of plasticizing monoisocyanate intermediates of isocyanates and monocarboxylic acids.

The epoxy compound is charged to a reaction vessel equipped with stirrer, addition funnel, reflux condensor and thermometer. The secondary amine, optionally in the presence of an isocyanate inert solvent such as ethyleneglycolmonoethylether acetate (ethylglycol acetate), is added within 1 hour and reacted completely at elevated temperature. The reaction product is mixed with the monoisocyanate intermediate and, preventing access of humidity, is reacted at 60°–70° C. for 1 to 3 hours until an NCO-value of 0 is recorded. The reaction with the isocyanate intermediate can also be carried out in two steps, i.e., the polymerizable type can be reacted first and then the plasticizing type is reacted. The results are not materially different.

Weight ratios and reaction conditions are listed in Table 6.

EVALUATION OF THE BINDERS ACCORDING TO EXAMPLES 1 TO 43

Of the binders each 100 g sample, based on resin solids, was mixed with the quantity of acid listed in Table 7 and made up to 1000 g with deionized water while stirring. The 10% solutions were deposited on various substrates as the cathode. Deposition time in all cases was 60 seconds. The coated substrates were rinsed with deionized water and cured at the listed temperature. Average film thickness of the cured films was between 13 to 17 μm.

Table 7 gives a summary of the test results. Definitions used in Table 7 are as follows:

(1) quantity of acid in grams added to 100 g of resin solids;
(2) E is acetic acid, A is formic acid, and M is lactic acid;
(3) pH is measured on a 10% aqueous solution;
(4) ST is steel, AL is aluminum, and CU is copper;
(5) König pendulum hardness DIN 53 157 (sec);
(6) Erichsen indentation DIN 53 156 (mm);
(7) hours of water soak at 40° C. until corrosion or blistering becomes visible; and
(8) salt spray ASTM-B 117-64; 2 mm of corrosion at the cross incision after the stated hours.

For this test degreased non-pretreated steel panels were coated with a pigmented paint containing 100 parts by weight of resin solids, 20 parts by weight of aluminum silicate pigment, and 2 parts by weight of carbon black.

TABLE 1

| | epoxy compound and solvent | | sec. amine | | reaction conditions | | | monoisocyanate interm | | reaction cond. NCO-value | |
|---|---|---|---|---|---|---|---|---|---|---|---|
| | type | quantity (g) | type | quantity (g) | addition h/°C. | post-reaction h/°C. | FKP | quantity (g) | type (solvent in AEAC) | hours | °C. |
| 1 | EPH A | 360 | DOLA | 210 | 1/80–90 | 1/130 | 80% | 380 | A (80%) | 1–2 | 50–60 |
|   | AEGLAC | 142 | | | | | | | | | |
| 2 | | | as in Example 1 | | | | | 325 | D (80%) | 1–2 | 50–60 |
| 3 | | | as in Example 1 | | | | | 432 | E (80%) | 1–2 | 50–60 |
| 4 | EPH A | 360 | DPA | 202 | 1/80–90 | 1/130 | 80% | 380 | A (80%) | 1–2 | 50–60 |
|   | AEGLAC | 142 | | | | | | | | | |
| 5 | EPH B | 950 | DOLA | 210 | 1/100–110 | 1/150 | 70% | 867 | B (70%) | 1–2 | 50–60 |
|   | AEGLAC | 500 | | | | | | | | | |
| 6 | | | as in Example 4 | | | | | 732 | F (70%) | 1–2 | 50–60 |
| 7 | | | as in Example 4 | | | | | 852 | H (70%) | 1–2 | 50–60 |
| 8 | COP I | 1000 | DOLA | 210 | 1/140 | 1/140 | 70% | 682 | C (70%) | 2 | 60 |
|   | AEGLAC | 520 | | | | | | | | | |
| 9 | | | as in Example 8 | | | | | 725 | G (70%) | 2 | 60 |
| 10 | COP I | 1000 | DBA | 528 | 1/140 | 1/140 | 70% | 682 | C (70%) | 2 | 60 |
|    | AEGLAC | 520 | | | | | | | | | |
| 11 | EPB | 600 | DIPA | 266 | 1/100–110 | 1/140 | 80% | 380 | A (80%) | 1–2 | 50–60 |
|    | AEGLAC | 215 | | | | | | | | | |
| 12 | | | as in Example 9 | | | | | 423 | G (80%) | 1–2 | 50–60 |

TABLE 2

| | basic intermediate and solvent | | | isocyanate intermediate | | reaction conditions for NCO-value = 0 | |
|---|---|---|---|---|---|---|---|
| | type | quantity (g) | FKP (%) | type %[1] | quantity (g) | hours | temp. °C. |
| 13 | COP II | 1000 | 70 | A, 70 | 646 | 2 | 60 |
|    | AEGLAC | 430 | | | | | |
| 14 | COP II | 1000 | 70 | G, 70 | 752 | 2 | 60 |
|    | AEGLAC | 430 | | | | | |
| 15 | OPE I | 960 | 70 | B, 70 | 868 | 2–3 | 70 |
|    | AEGLAC | 410 | | | | | |
| 16 | OPE I | 960 | 70 | G, 70 | 966 | 2–3 | 70 |
|    | AEGLAC | 410 | | | | | |

TABLE 3

| | anhydride compound and solvent | | alkanolamine | | reaction conditions | | monoisocyanate intermediate | | reaction conditions for NCO-value = 0 | |
|---|---|---|---|---|---|---|---|---|---|---|
| | type | quantity (g) | type | quantity (g) | temp. °C. | acid value mg KOH/g | type %[1] | quantity (g) | hours | temp. °C. |
| 17 | COP III | 1000 | DMEA | 178 | 140 | 95 | C, 70 | 910 | 3 | 60 |
|    | AEGLAC | 504 | | | | | | | | |
| 18 | COP III | 1000 | DMEA | 178 | 140 | 95 | H, 70 | 853 | 3 | 60 |
|    | AEGLAC | 504 | | | | | | | | |
| 19 | PBA | 1000 | DMEA | 178 | 135 | 95 | A, 70 | 868 | 3 | 60 |
|    | AEGLAC | 504 | | | | | | | | |
| 20 | PBA | 1000 | DMEA | 178 | 135 | 95 | G, 70 | 966 | 3 | 60 |
|    | AEGLAC | 504 | | | | | | | | |

[1] % solution in AEAC

TABLE 4

| | epoxy compound and solvent | | dicarboxylic acid | | sec. amine | | FKP % | monoisocyanate | | reaction conditions NCO-value = 0 | |
|---|---|---|---|---|---|---|---|---|---|---|---|
| | type | quantity (g) | type | quantity (g) | type | quantity (g) | | quantity (g) | type (% sol. in AEAC) | hours | temp. °C. |
| 21 | EPH A | 720 | ADI | 146 | DOLA | 210 | 80 | 760 | A (80%) | 1–2 | 50–60 |
|    | AEGLAC | 270 | | | | | | | | | |
| 22 | | | as in Example 1 | | | | | 846 | G (80%) | 2 | 60 |
| 23 | | | as in Example 1 | | | | | 745 | H (80%) | 2 | 60 |
| 24 | EPH A | 720 | ADI | 146 | DIPA | 266 | 80 | 760 | B (80%) | 1–2 | 50–60 |
|    | AEGLAC | 286 | | | | | | | | | |
| 25 | EPH A | 720 | SUB | 174 | DOLA | 210 | 80 | 760 | A (80%) | 1–2 | 50–60 |
|    | AEGLAC | 279 | | | | | | | | | |
| 26 | | | as in Example 5 | | | | | 760 | B (80%) | 1–2 | 50–60 |
| 27 | EPH C | 1040 | SUB | 174 | DOLA | 210 | 70 | 868 | A (70%) | 1–2 | 50–60 |
|    | | 582 | | | | | | | | | |
| 28 | | | as in Example 7 | | | | 70 | 868 | B (70%) | 1–2 | 50–60 |

TABLE 5

| | epoxy compound and solvent | | sec. amine | | | monoisocyanate - intermediate polymerizable type (%) | | plasticizing FKP | | reaction conditions NCO-value = 0 | |
|---|---|---|---|---|---|---|---|---|---|---|---|
| | type | quantity (g) | type | quantity (g) | % | quantity (g) | sol. in AEAC | quantity (g) | type | hours | temp. °C. |
| 29 | EPH A AEGLAC | 360 143 | DOLA | 210 | 80 | 380 | A (80%) | 159 | I (100%) | 2 | 60–70 |
| 30 | EPH A AEGLAC | 360 143 | DOLA | 210 | 80 | 380 | B (80%) | 221 | K (100%) | 2 | 60–70 |
| 31 | EPH A AEGLAC | 360 143 | DOLA | 210 | 80 | 424 | H (80%) | 220 | L (100%) | 2–3 | 70 |
| 32 | EPH A AEGLAC | 360 157 | DIPA | 266 | 80 | 397 | C (80%) | 159 | I (100%) | 2 | 60–70 |
| 33 | EPH B AEGLAC | 950 500 | DOLA | 210 | 70 | 870 | A (70%) | 442 | K (100%) | 2 | 60–70 |
| 34 | EPH B AEGLAC | 950 500 | DOLA | 210 | 70 | 908 | C (70%) | 440 | L (100%) | 2 | 60–70 |
| 35 | EPH B AEGLAC | 950 500 | DOLA | 210 | 70 | 966 | G (70%) | 440 | L (100%) | 2–3 | 70 |
| 36 | EPH B AEGLAC | 950 500 | DOLA | 210 | 70 | 852 | H (70%) | 440 | L (100%) | 2–3 | 70 |
| 37 | EPH A AEGLAC | 360 143 | DOLA | 210 | 70 | 610 | M (80%) | (combined intermediate) | | 2 | 60–70 |

TABLE 6

| | epoxy compound and solvent | | sec. amine | | FKP % | monoisocyanate - isocyanate polymerizable type (% | | plasticizing type (60 | | reaction conditions NCO-value = 0 | |
|---|---|---|---|---|---|---|---|---|---|---|---|
| | type | quantity (g) | type | quantity (g) | | quantity (g) | sol. in AEAC | quantity (g) | % sol. DMF) | hours | temp. °C. |
| 38 | EPH A AEGLAC | 360 143 | DOLA | 210 | 80 | 380 | A (80%) | 312 | N | 2 | 60–70 |
| 39 | EPH A AEGLAC | 360 143 | DOLA | 210 | 80 | 380 | B (80%) | 354 | O | 2 | 60–70 |
| 40 | EPH A AEGLAC | 360 157 | DIPA | 266 | 80 | 397 | C (80%) | 354 | O | 2 | 60–70 |
| 41 | EPH B AEGLAC | 950 500 | DOLA | 210 | 70 | 870 | A (70%) | 708 | O | 2 | 60–70 |
| 42 | EPH B AEGLAC | 950 500 | DOLA | 210 | 70 | 908 | C (70%) | 644 | P | 2 | 60–70 |
| 43 | EPH A AEGLAC | 360 143 | DOLA | 210 | 70 | 700 | R (70%) | (combined intermediate) | | 2 | 60–70 |

TABLE 7

| | neutralization | | | deposition | | | tests | | |
|---|---|---|---|---|---|---|---|---|---|
| | 1 quantity | 2 type | 3 pH | 4 substrate | volt | curing min/°C. | 5 hardness | 6 indentation | 7/8 resistance |
| 1 | 3.8 | E | 6.9 | ST | 130 | 25/165 | 190 | 7.2 | 480/220 |
| 2 | 3.5 | E | 6.7 | ST | 120 | 25/170 | 195 | 7.0 | 240/120 |
| 3 | 3.5 | E | 6.8 | ST | 130 | 25/170 | 170 | 7.2 | 240/140 |
| 4 | 3.5 | E | 6.2 | ST | 130 | 25/175 | 180 | 6.8 | 360/140 |
| 5 | 3.8 | E | 7.3 | ST | 280 | 20/180 | 210 | 7.0 | 480/240 |
| 6 | 3.2 | A | 6.8 | ST | 250 | 25/180 | 195 | 6.7 | 240/100 |
| 7 | 3.5 | A | 6.5 | ST | 250 | 20/180 | 170 | 8.6 | 480/220 |
| 8 | 4.0 | E | 6.1 | AL | 290 | 20/175 | 170 | 7.1 | 480/— |
| 9 | 4.0 | E | 6.0 | AL | 290 | 20/180 | 190 | 6.9 | 480/— |
| 10 | 3.8 | E | 6.0 | AL | 270 | 25/180 | 175 | 7.0 | 480/— |
| 11 | 3.8 | E | 6.0 | ST | 220 | 20/160 | 170 | 7.3 | 480/220 |
| 12 | 3.8 | E | 6.2 | ST | 230 | 20/160 | 185 | 7.0 | 480/220 |
| 13 | 4.2 | E | 6.1 | ST | 250 | 20/180 | 170 | 7.2 | 480/200 |
| 14 | 4.2 | E | 6.0 | ST | 270 | 20/180 | 190 | 7.0 | 480/240 |
| 15 | 4.5 | M | 5.5 | CU | 200 | 25/170 | 160 | 8.9 | 360/— |
| 16 | 4.5 | M | 5.4 | CU | 220 | 20/180 | 180 | 8.6 | 360/— |
| 17 | 3.5 | E | 6.1 | ST | 250 | 25/170 | 190 | 7.2 | 360/180 |
| 18 | 3.5 | E | 6.2 | ST | 250 | 25/170 | 175 | 8.1 | 360/160 |
| 19 | 3.5 | E | 6.6 | ST | 260 | 15/180 | 180 | 8.1 | 480/200 |
| 20 | 3.5 | E | 6.5 | ST | 270 | 15/180 | 190 | 7.7 | 480/220 |
| 21 | 3.2 | E | 6.2 | ST | 210 | 20/180 | 170 | 7.9 | 360/240 |
| 22 | 3.6 | M | 5.9 | ST | 230 | 25/180 | 175 | 8.1 | 360/200 |
| 23 | 3.4 | E | 6.1 | ST | 220 | 20/180 | 160 | 9.2 | 360/220 |
| 24 | 3.8 | E | 6.0 | ST | 230 | 20/180 | 170 | 8.3 | 480/360 |

TABLE 7-continued

| | neutralization | | | deposition | | | tests | | |
|---|---|---|---|---|---|---|---|---|---|
| | 1 quantity | 2 type | 3 pH | 4 sub-strate | volt | curing min/°C. | 5 hard-ness | 6 inden-tation | 7/8 resis-tance |
| 25 | 3.8 | M | 6.2 | ST | 250 | 25/180 | 165 | 8.9 | 360/220 |
| 26 | 3.8 | M | 6.2 | ST | 250 | 25/180 | 160 | 8.9 | 360/220 |
| 27 | 3.6 | M | 6.1 | ST | 270 | 25/180 | 175 | 8.3 | 360/320 |
| 28 | 3.6 | M | 6.1 | ST | 270 | 25/180 | 170 | 8.2 | 360/320 |
| 29 | 3.6 | E | 6.0 | ST | 190 | 25/180 | 155 | 7.5 | 240/120 |
| 30 | 3.8 | M | 6.1 | ST | 210 | 25/180 | 170 | 8.3 | 360/180 |
| 31 | 4.2 | M | 5.8 | ST | 230 | 25/180 | 180 | 8.5 | 360/140 |
| 32 | 4.0 | M | 6.0 | ST | 230 | 25/180 | 150 | 7.8 | 240/120 |
| 33 | 3.8 | E | 6.0 | ST | 250 | 20/180 | 185 | 8.1 | 480/360 |
| 34 | 4.2 | M | 6.3 | ST | 260 | 20/180 | 170 | 8.2 | 480/320 |
| 35 | 4.5 | M | 6.2 | ST | 260 | 25/180 | 180 | 7.8 | 480/240 |
| 36 | 4.5 | M | 6.2 | ST | 230 | 25/180 | 160 | 8.2 | 360/180 |
| 37 | 3.8 | E | 6.0 | ST | 200 | 20/180 | 175 | 8.0 | 360/240 |
| 38 | 3.6 | E | 6.0 | ST | 190 | 25/180 | 155 | 7.5 | 140/100 |
| 39 | 3.8 | M | 6.1 | ST | 210 | 20/180 | 170 | 8.3 | 260/180 |
| 40 | 4.0 | M | 6.0 | ST | 230 | 25/180 | 150 | 7.8 | 240/120 |
| 41 | 3.8 | E | 6.0 | ST | 230 | 20/180 | 185 | 7.1 | 380/260 |
| 42 | 4.5 | M | 6.0 | ST | 160 | 20/180 | 170 | 7.2 | 180/120 |
| 43 | 4.0 | E | 5.8 | ST | 180 | 20/180 | 175 | 8.0 | 260/140 |

It is claimed:
1. Process for producing self-crosslinking coating compositions for cathodically depositable electrodeposition paints including the steps of reacting (A) a resin carrying reactive amine groups and reactive hydroxyl or carboxyl groups, or mixtures thereof, with (B) a sufficient amount to render the coating composition water dilutable when reacted with an acid, of a reaction product carrying one free isocyanate group and which is obtained through reaction of aromatic or aliphatic or cycloaliphatic polyisocyanates or mixtures thereof and α,β-ethylenically unsaturated monomers carrying at least one isocyanate reactive hydrogen atom and the group

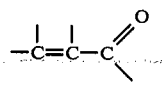

and reacting the reaction product of (A) and (B) with an acid until water soluble.

2. Process according to claim 1 wherein the reacting acid is an organic acid.

3. Process according to claim 1 wherein the reacting acid is an inorganic acid.

4. Process according to claim 1 wherein resin (A) is the reaction product of an epoxide resin and a secondary amine.

5. Process according to claim 4 wherein the secondary amine is an aliphatic amine.

6. Process according to claim 4 wherein the secondary amine is a cyclic amine.

7. Process according to claim 4 wherein the secondary amine is an alkanolamine.

8. Process according to claim 1 wherein resin (A) is the reaction product obtained from 2 moles of a diepoxy compound, 1 mole of an aliphatic dicarboxylic acid, and 2 moles of a secondary amine.

9. Process according to claim 8 wherein the secondary amine is a dialkanolamine.

10. Process according to claim 1 wherein resin (A) is a copolymer of a basic monomer with at least one other copolymerizable monomer.

11. Process according to claim 1 wherein resin (A) is a polyester carrying oxazoline groups.

12. Process according to claim 1 wherein resin (A) is the reaction product obtained from an anhydrous polymer, condensate, or addition compound with a monoalkanol amine.

13. Process according to claim 1 wherein in reaction product (B) the quantity of unsaturated monoisocyanate intermediate is chosen in order to give in 1000 molecular weight units at least 0.5 ethylenically unsaturated bonds.

14. Process according to claim 13 wherein there are from 0.8–2.5 ethylenically unsaturated bonds.

15. Process according to claim 1 wherein the reaction between components (A) and (B) is carried out at 20° to 80° C.

16. Process according to claim 1 wherein the reaction between (A) and (B) is carried out at 40° to 60° C.

17. Process according to claim 1 wherein the reaction between (A) and (B) is carried out in the presence of an isocyanate inert organic solvent.

18. Process according to claim 1 wherein (A) and (B) are reacted with (C) from 10 to 100 mole-%, calculated on the sum of the still free hydroxy and carboxy groups, of a reaction product carrying one free isocyanate group obtained from an aliphatic or aromatic or cycloaliphatic polyisocyanate, or mixtures thereof, and a monoalcohol with at least 6 C-atoms.

19. Process according to claim 18 wherein the monoalcohol is saturated.

20. Process according to claim 18 wherein the monoalcohol is unsaturated.

21. Process according to claim 1 wherein (A) and (B) are reacted with (C) from 10 to 100 mole-%, calculated on the sum of the still free hydroxy and carboxy groups, of a reaction product carrying one free isocyanate group obtained from an aliphatic or aromatic or cycloaliphatic polyisocyanate, or mixtures thereof, and a monocarboxylic acid with at least 6 C-atoms.

22. Process according to claim 21 wherein the monocarboxylic acid is saturated.

23. Process according to claim 21 wherein the monocarboxylic acid is unsaturated.

24. Process according to claim 18 wherein the reaction with (C) is carried out simultaneously with the reaction of (A) and (B).

25. Process according to claim 24 wherein the reaction with (C) is carried out after the reaction of (A) and (B).

26. Process according to claim 1 wherein a modifying isocyanate component is included in the form of a mixed isocyanate intermediate comprising (a) 1 mole of diisocyanate, (b) 0.4 to 0.9 moles of hydroxy(meth)acrylate, and (c) 0.1 to 0.6 moles of monoalcohol, the sum of (b) and (c) adding up to 1.0.

27. Process according to claim 1 wherein a modifying isocyanate component is included in the form of a mixed isocyanate intermediate comprising (a) 1 mole of diisocyanate, (b) 0.4 to 0.9 moles of hydroxy(meth)acrylate, and (c) 0.1 to 0.6 moles of monocarboxylic acid, the sum of (b) and (c) adding up to 1.0.

28. Process according to claim 27 wherein the monocarboxylic acid is a semiester of a dicarboxylic acid anhydride and a monoalcohol.

29. Process according to claim 1 wherein the basicity of the coating composition is adjusted in order that upon reaction with an acid to a pH-value of from 4 to 9 it attains dilutability with water.

30. Process according to claim 29 wherein the pH-value is from 6 to 8.

31. Self-crosslinking coating composition which will cathodically deposit on electrodeposition which is the reaction product of (A) a resin carrying reactive amine groups and reactive hydroxyl or carboxyl groups, or mixtures thereof, and (B) a sufficient amount to render the coating composition water dilutable when reacted with an acid, of a reaction product carrying one free isocyanate group of an aromatic or aliphatic or cycloaliphatic polyisocyanate or mixtures thereof and an α,β-ethylenically unsaturated monomer carrying at least one isocyanate reactive hydrogen atom and the group

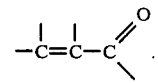

32. Coating composition according to claim 31 wherein resin (A) is the reaction product of an epoxide resin and a secondary amine.

33. Coating composition according to claim 32 wherein the secondary amine is an aliphatic amine.

34. Coating composition according to claim 32 wherein the secondary amine is a cyclic amine.

35. Coating composition according to claim 32 wherein the secondary amine is an alkanolamine.

36. Coating composition according to claim 31 wherein resin (A) is the reaction product obtained from 2 moles of a diepoxy compound, 1 mole of an aliphatic dicarboxylic acid, and 2 moles of a secondary amine.

37. Coating composition according to claim 36 wherein the secondary amine is a dialkanolamine.

38. Coating composition according to claim 31 wherein resin (A) is a copolymer of a basic monomer with at least one other copolymerizable monomer.

39. Coating composition according to claim 31 wherein resin (A) is a polyester carrying oxazoline groups.

40. Coating composition according to claim 31 wherein resin (A) is the reaction product obtained from an anhydrous polymer, condensate, or addition compound with a monoalkanol amine.

41. Coating composition according to claim 31 wherein in reaction product (B) the quantity of unsaturated monoisocyanate intermediate is chosen in order to give in 1000 molecular weight units at least 0.5 ethylenically unsaturated bonds.

42. An aqueous solution comprising the acid neutralized coating composition of claim 31.

* * * * *